United States Patent
Wang et al.

[11] Patent Number: 5,874,185
[45] Date of Patent: Feb. 23, 1999

[54] POLYMER ELECTROLYTE MATERIAL FOR USE IN LITHIUM AND LITHIUM ION BATTERIES

[75] Inventors: Yung-Yun Wang; Chi-Chao Wan, both of Taipei; Hsi-Yueh Sung, Taichung Hsien, all of Taiwan

[73] Assignee: Industrial Technology Research Institute, Hsinchu, Taiwan

[21] Appl. No.: 900,209

[22] Filed: Jul. 24, 1997

[51] Int. Cl.$^6$ .......................... H01M 10/40; H01M 10/36
[52] U.S. Cl. .......................................................... 429/192
[58] Field of Search ............................ 429/192; 252/62.2

[56] References Cited

U.S. PATENT DOCUMENTS

| | | | |
|---|---|---|---|
| 4,216,073 | 8/1980 | Goldstein | 429/192 X |
| 4,496,638 | 1/1985 | Sugiuch et al. | 429/192 |
| 5,252,413 | 10/1993 | Alamgir et al. | 429/192 |

Primary Examiner—John S. Maples
Attorney, Agent, or Firm—W. Wayne Liauh

[57] ABSTRACT

A polymer electrolyte for use in lithium batteries is disclosed. It contains: (a) a poly(vinyl chloride-co-vinyl acetate), or PVCAC, which is a copolymer containing 5 to 25 mol % of a vinyl chloride monomer, and 75 to 95 mol % of a vinyl acetate monomer; (b) a lithium salt; and (c) an organic solvent mixture. The organic solvent mixture contains at least one component selected from the group consisting of EC and PC and a high-boiling-point organic solvent. Preferably, the amount of the PVCAC is about 16–40 mol % of the polymer electrolyte, lithium about 3–12 mol %, and the organic solvent mixture about 48–81 mol %, when the polymer electrolyte was freshly prepared. Preferably, the high-boiling-point is DMF or NMP. Within the organic solvent mixture, if DMF is used, it should preferably be about 20–60 mol % of the total organic solvent mixture. If NMP is used, it should preferably be about 10–40 mol % of the total organic solvent mixture.

18 Claims, 3 Drawing Sheets

POLYMER ELECTROLYTE MATERIAL FOR USE IN LITHIUM AND LITHIUM ION BATTERIES

FIELD OF THE INVENTION

The present invention relates to a polymer electrolyte material for use in lithium and lithium ion batteries. More specifically, the present invention relates to a lithium ($Li^+$) ion conductive polymer gel electrolyte which exhibits desirable characteristics in lithium ion conductivity, electrochemical stability, chemical compatibility and dimensional stability, and can be advantageously used in preparing primary and secondary lithium batteries.

BACKGROUND OF THE INVENTION

Because of their high energy density and output power, lithium secondary batteries have received great attention as candidates for making high performance batteries which can be used in a wide spectrum of applications such as notebook PC's, mobile phones, and many other portable devices. Polymer-electrolyte-based lithium secondary batteries have attracted particular attention because of their perceived huge potential in consumer and other electronic goods. In addition to the desirable characteristics typically provided by lithium secondary batteries, polymer electrolyte batteries, which typically exist in the form of a film-type solid state battery, further provide the advantages of relative ease of manufacturing and excellent shapability. These advantageous properties meet many of the demands of today's information industry, and have generated significant research and development interests in attempt to further improve the properties of polymer electrolyte for use in lithium secondary batteries.

In a paper presented at the Second International Meeting on Solid Electrolytes held at St. Andrews, Scotland (Sep. 20–22, 1978), M. B. Armand, J. M. Chabagno and M. Duclot disclosed that a complex of poly(ethylene oxide), or PEO, and lithium ions can be used as a solid electrolyte in lithium batteries. However, after repeated research and development efforts, it was found that the conductivity of PEO-based polymer electrolytes at temperatures between 40 and 100° C. can only reach about $10^{-8}$ to $10^{-4}$ $S\text{-}cm^{-1}$. Such a low ionic conductivity severely limits the potential use of PEO-based electrolytes in lithium secondary batteries.

In 1993, in an article entitled "Li ion conductive electrolytes based on poly(vinyl chloride)", J. Electrochem. Soc., 140, L96–97, M. Alamgir and K. M. Abraham disclosed a PVC (poly(vinyl chloride))-based polymer electrolyte which used THF (tetrahydrofuran) as a carrier solvent. The lithium ion conductivity of their PVC cells was improved to $10^{-3}$ $S\text{-}cm^{-1}$.

The use of PVC-based polymer electrolyte had been disclosed by M. Watanabe, et al, who, in an article entitled "High lithium ionic-conductivity of polymeric solid electrolytes," Makromol. Chem. Rapid. Comm. 2, pp 741–744 (1981), taught a solid polymer electrolyte composed of solvates of Li salts immobilized in a solid organic polymer matrix containing PVC dissolved in a mixture solvent of EC (ethylene carbonate) and PC (propylene carbonate). However, because neither EC nor PC is a good solvent for PVC, the resultant polymer electrolyte exhibited unsatisfactorily poor lithium ion conductivity. The use of THF as a carrier solvent, as disclosed by Alamgir et al, ameliorated the solubility problem. However, this improvement was found not to endure. With time, the carrier solvent THF gradually evaporated, and, as a result, it was found that the EC/PC molecules would exude from the polymer matrix. When this occurred, it was also observed that the THF-modified-PVC-based polymer electrolyte disclosed by Alamgir et al experienced a precipitous drop in its lithium ion conductivity, from the high of $10^{-3}$ $S\text{-}cm^{-1}$ to below $10^{-7}$ $S\text{-}cm^{-1}$.

Because of the significant potential market of solid state polymer electrolytes, it is highly desirable to develop new and improved materials that will overcome the shortcomings observed in the prior art materials.

SUMMARY OF THE INVENTION

The primary object of the present invention is to develop an improved polymer electrolyte for use in lithium batteries. More specifically, the primary object of the present invention is to develop an improved solid state polymer electrolyte for use in lithium batteries which can provide high lithium ion conductivity and will exhibit long-term electrochemical and dimensional stability and chemical compatibility.

Unexpected results were observed when poly(vinyl chloride-co-vinyl acetate), or PVCAC, was used in the place of the conventional PVC. A lithium secondary battery prepared using PVCAC was found to exhibit similar or better lithium ion conductivity than those prepared using PVC. However, unlike PVC, which must use a low-boiling point solvent such as THF (boiling point=65° C.) as a carrier solvent, a properly formulated PVCAC as disclosed in the present invention can be dissolved in a number of high-boiling point (boiling point greater than that of tetrahydrofaran) organic solvents such as N,N-dimethylformamide (DMF, bp=158° C.), or N-methyl pyrrolidinone (NMP, bp=204° C.), and the polymer/solvent mixture is readily miscible with EC, PC, or (EC+PC) mixture.

The polymer electrolyte disclosed in the present invention comprises:

(1) a poly(vinyl chloride-co-vinyl acetate), or PVCAC, which is a copolymer containing 5 to 25 mol % of a vinyl chloride monomer, and 75 to 95 mol % of a vinyl acetate monomer;

(2) a lithium salt; and (3) an organic solvent mixture containing:
   (i) at least one component selected from the group consisting of EC and PC;
   (ii) a high-boiling-point organic solvent.

Preferably, the amount of the PVCAC should be about 16–40 mol % of the polymer electrolyte, lithium should be about 3–12 mol %, and the organic solvent mixture should be about 48–81 mol %, when the polymer electrolyte is freshly prepared. Preferrably, the high-boiling-point is DMF or NMP. Within the organic solvent mixture, if DMF is used, it should preferably be about 20–60 mol % of the total organic solvent mixture. If NMP is used, it should preferably be about 10–40 mol % of the total organic solvent mixture.

The PVCAC-based polymer electrolyte disclosed in the present invention exhibits high lithium ion conductivity (about $10^{-3}$ $S\cdot cm^{-1}$) and excellent electrochemical stability (>4.5 V vs. $Li/Li^+$). However, the main advantage is that because the PVCAC-based polymer electrolyte contains only high boiling-point organic solvent and does not contain low boiling-point solvent such as THF, no exudation of solvent molecules would occur. And the resultant lithium secondary battery exhibited excellent long-term stability.

BRIEF DESCRIPTION OF THE DRAWINGS

The present invention will be described in detail with reference to the drawing showing the preferred embodiment of the present invention, wherein.

DETAILED DESCRIPTION OF THE PREFERRED EMBODIMENT

The present invention discloses an improved polymer electrolyte which contains (a) a poly(vinyl chloride-co-vinyl acetate), or PVCAC, which is a copolymer containing 5 to 25 mol % of a vinyl chloride monomer, and 75 to 95 mol % of a vinyl acetate monomer; (b) a lithium salt; (c) at least one component selected from the group consisting of EC and PC; and (d) a high-boiling-point organic solvent. The PVCAC-based secondary lithium batteries disclosed in the present invention exhibited similar or better conductivity than those prepared using PVC. As discussed above, the PVC-based lithium batteries suffered from the problem in that the low-boiling-point carrier solvent of THF would evaporate from the polymer matrix over time, resulting in exudation of the EC or PC molecules from the polymer matrix and a severe degradation of ion conductivity of the polymer electrolyte.

Preferably, the amount of the PVCAC should be about 16–40 mol % of the polymer electrolyte, lithium should be about 3–12mol %, and the total organic solvent mixture should not exceed about 81mol %. Preferably, the high-boiling-point organic solvent is DMF or NMP. Within the total organic solvent mixture, if DMF is used, it should preferably be about 20–40mol % of the total organic solvent mixture. On the other hand, if NMP is used, it should preferably be about 10–40mol % of the total organic solvent mixture.

In the present invention, a properly formulated PVCAC is disclosed which can be dissolved in a number of high-boiling-point (boiling point greater than that of tetrahydrofuran) organic solvents such as N,N-dimethylformamide (DMF, bp=158° C.), or N-methyl pyrrolidinone (NMP, bp =204° C.), and the polymer/solvent mixture is readily miscible with EC, PC, or (EC+PC) mixture. The PVCAC-based polymer electrolyte disclosed in the present invention exhibited high ionic conductivity (about $10^{-3}$ S·cm$^{-1}$) and excellent electrochemical stability (>4.5 V vs. Li/Li+). However, because the PVCAC-based polymer electrolyte of the present invention contains only high boiling-point organic solvent and does not contain low boiling-point solvent such as THF, no exudation of solvent molecules would occur. And the resultant lithium secondary battery exhibited excellent long-term stability.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Figure 1:
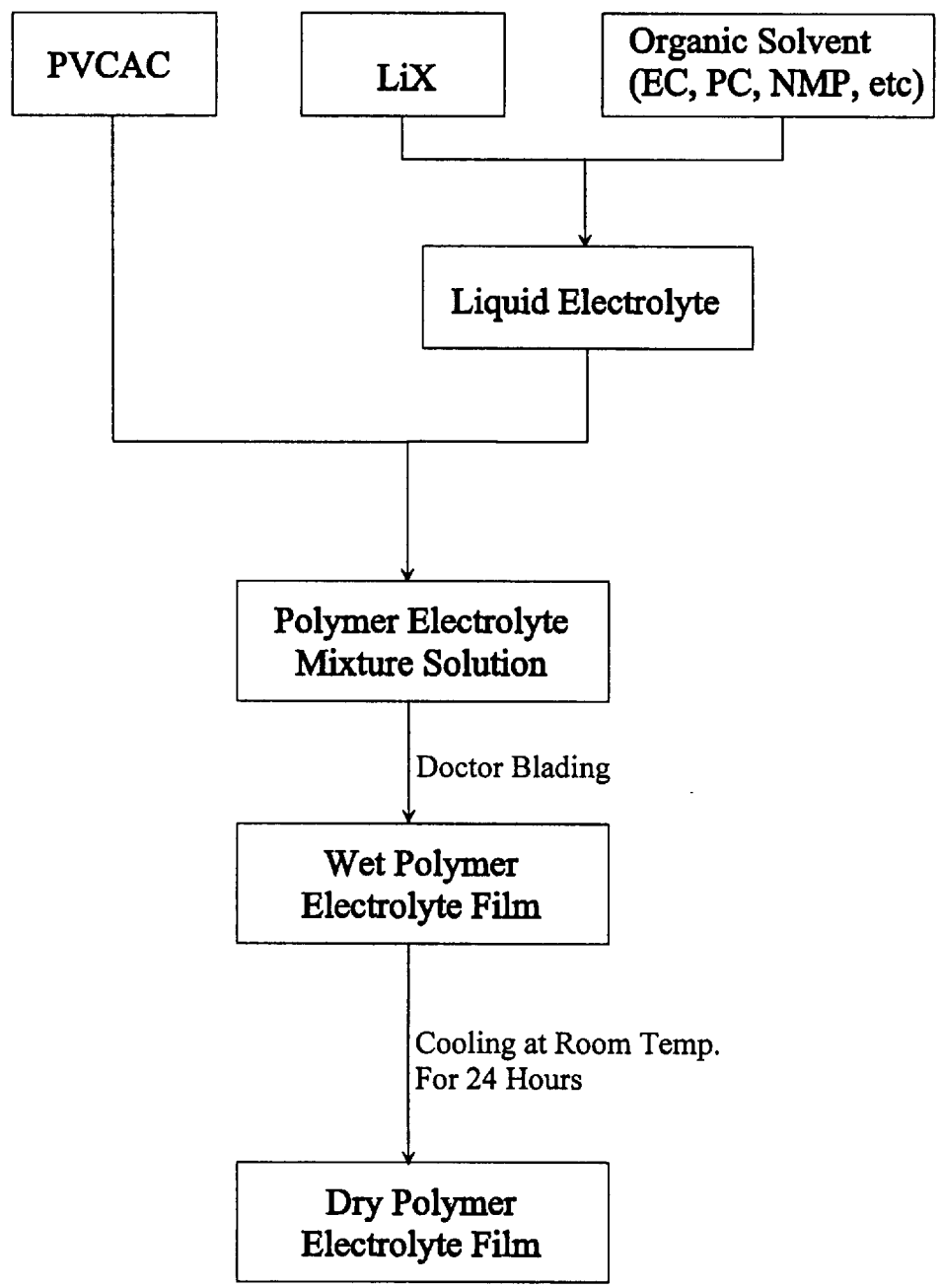
FIG. 1 is a schematic flowchart diagram illustrating the process of preparing the polymer electrolyte of the present invention.

FIG. 1 is a schematic flowchart diagram illustrating the steps of process of preparing the polymer electrolyte according to a preferred embodiment of the present invention. 0.44 g of a lithium salt LiClO$_4$, 2.38 g of EC, 2.75 g of PC and 3.15 g of DMF were placed in a Pyrex beaker, stirred with a magnetic bar, and heated at a temperature of 40° C. After the lithium salt was completely dissolved, 1.25 g of PVCAC powder was gradually added into the lithium salt solution, while the stirring continued, to form a viscous solution. Thereafter, the viscous solution was poured onto a clean glass plate, and a thin film was formed using a doctor blade. The wet film was placed inside an enclosure wherein its temperature was slowly lowered. After 24–36 hours, a viscoelastic, translucent polymer electrolyte film was formed, designated as PVCAC-DMF/EC/PC-LiClO$_4$. The PVCAC-DMF/EC/PC-LiClO$_4$ polymer electrolyte was subject to AC-impedance analysis at various temperatures. The test results are shown as curve (b) in FIG. 2. The PVCAC-DMF/EC/PC-LiClO$_4$ polymer electrolyte obtain in this example is also designated as 16 PVCAC-35.8DMF/22, 4EC/22.4PC-3.4LiClO$_4$ polymer electrolyte, wherein the numerals indicating the molar percent.

EXAMPLE 2

Figure 2:
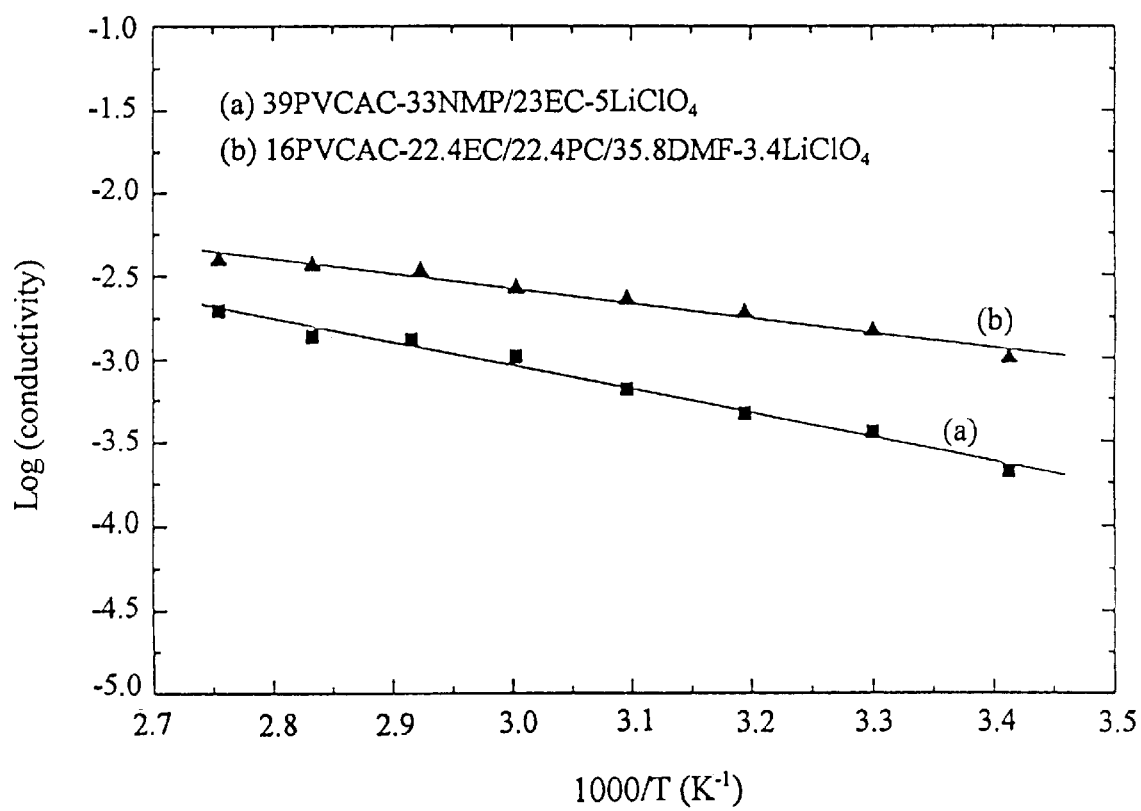
FIG. 2 shows plots of lithium ion conductivities vs. temperature for lithium batteries using PVCAC-DMF/EC/PC-LiClO$_4$ and PVCAC-NMP/EC-LiClO$_4$ polymer electrolytes prepared in the present invention.

0.26 g of LiClO$_4$, 1.00 g of EC, 1.62 g of NMP were placed in a Pyrex beaker, stirred with a magnetic bar, and heated at a temperature of 40° C. After the lithium salt was completely dissolved, 1.25 g of PVCAC powder was gradually added into the lithium salt solution, while the stirring continued, to form a viscous solution. Thereafter, the viscous solution was poured onto a clean glass plate, and a thin film was formed using a doctor blade. The wet film was placed inside an enclosure wherein its temperature was slowly lowered. After 24–36 hours, a viscoelastic, translucent polymer electrolyte film was formed, designated as PVCAC-NMP/EC-LiClO$_4$. The PVCAC-NMP/EC-LiClO$_4$ polymer electrolyte was subject to AC-impedance analysis at various temperatures. The test results are also shown in FIG. 2 as curve (a). The PVCAC-NMP/EC-LiClO$_4$ polymer electrolyte obtain in this example is also designated as 39PVCAC-33NMP/23EC-5LiClO$_4$ polymer electrolyte, wherein the numerals likewise indicating the molar percent.

EXAMPLE 3

The procedure in Example 3 was identical to that described in Example 1, except that the polymer electrolyte film was prepared by pouring the viscous solution onto a Teflon plate and was confined within a washer having a thickness of 100 $\mu$. Another Teflon plate was placed upon the washer to close the viscous solution. After cooling and setting for several days, the Teflon plates and the washer were removed and a PVCAC-DMF/EC/PC-LiClO$_4$ polymer electrolyte was obtained. The PVCAC-DMF/EC/PC-LiClO$_4$ polymer electrolyte so formed exhibited similar lithium ion conductivities vs. temperature characteristics as curve (b) shown in FIG. 2.

EXAMPLE 4

Figure 3A:
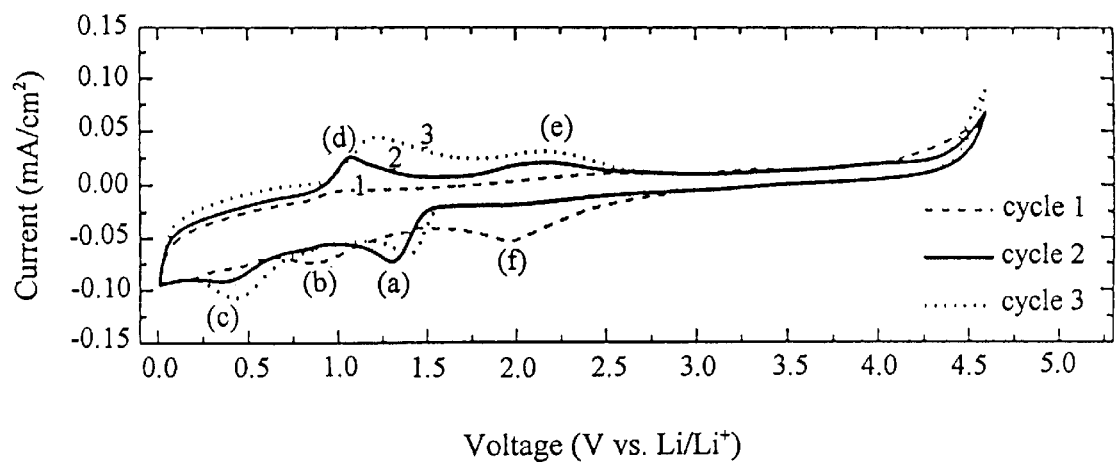
FIG. 3(A) shows a cyclic voltammogram measured from a lithium secondary battery containing a 16PVCAC-35.8DMF/22,4EC/22.4PC-3.4LiClO$_4$ polymer electrolyte.

The PVCAC-DMF/EC/PC-LiClO$_4$ polymer electrolyte obtained in Example 1 was placed inside a three-electrode test cell to conduct cyclic voltammetric experiments. The three electrodes were a stainless steel SS-316, a reference electrode and a counter electrode. Both the reference electrode and the counter electrode were lithium metal electrodes. The voltage scanning speed was set at 10 mV/s and voltage scanning range was from 0 to 5V vs. Li/Li+. The test results, which are shown in FIG. 3(A), indicate excellent electrochemical stability for the PVCAC-DMF/EC/PC-LiClO$_4$ polymer electrolyte.

EXAMPLE 5

Figure 3B:
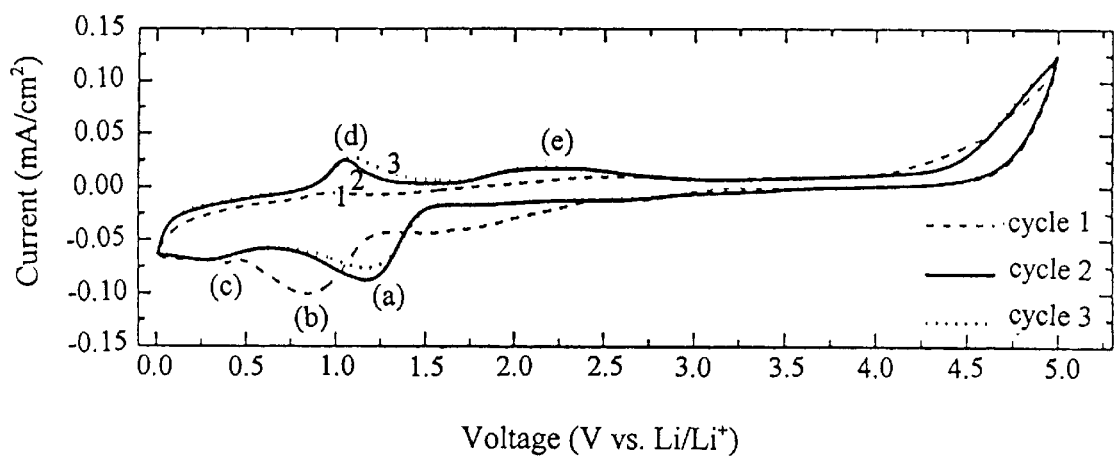
FIG. 3(B) shows a cyclic voltammogram measured from a lithium secondary battery containing a 39PVCAC-33NMP/23-5LiClO$_4$polymer electrolyte.

The PVCAC-NMP/EC-LiClO$_4$ polymer electrolyte obtained in Example 1 was placed inside a in a three-electrode test cell to conduct cyclic voltammetric experiments. The three electrodes were a stainless steel SS-316, , a reference electrode and a counter electrode. Both the reference electrode and the counter electrode were lithium metal electrodes. The voltage scanning speed was set at 10 mV/s and voltage scanning range was from 0 to 5V vs. Li/Li+. The test results, which are shown in FIG. 3(B), indicate excellent electrochemical stability for the PVCAC-NMP/EC-LiClO$_4$ polymer electrolyte.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A polymer electrolyte for use in lithium battery comprising:
    (a) a poly(vinyl chloride-co-vinyl acetate), or PVCAC, which is a copolymer containing 5 to 25 mol % of a vinyl chloride monomer, and 75 to 95 mol % of a vinyl acetate monomer;
    (b) a lithium salt; and
    (c) an organic solvent mixture containing:
        (i) at least one component selected from the group consisting of EC and PC; and
        (ii) a high-boiling-point organic solvent;
    (d) wherein the molar ratio between PVCAC and the lithium salt ranges between about 16:12 to about 40:3, and the amount of the organic solvent mixture does not exceed about 81 mol % of the total polymer electrolyte.

2. The polymer electrolyte according to claim 1 wherein the high-boiling-point organic solvent is N,N-dimethylformamide (DMF), or N-methyl pyrrolidinone (NMP).

3. The polymer electrolyte according to claim 1 wherein the high-boiling-point organic solvent is N,N-dimethylformamide (DMF), which constitutes about 20–60 mol % of the organic solvent mixture.

4. The polymer electrolyte according to claim 1 wherein the high-boiling-point organic solvent is N-methyl pyrrolidinone (NMP), which constitutes about 10–40 mol % of the organic solvent mixture.

5. The polymer electrolyte according to claim 1 wherein the lithium salt is selected from the group consisting of LiClO$_4$, LiCF$_3$SO$_3$, LiPF$_6$, LiAsF$_6$, LiBF$_4$, and LiN(CF$_3$SO$_2$)$_2$.

6. The polymer electrolyte according to claim 1 wherein the lithium salt is LiClO$_4$.

7. A lithium secondary battery comprising a polymer electrolyte, wherein the polymer electrolyte contains:
    (a) a poly(vinyl chloride-co-vinyl acetate), or PVCAC, which is a copolymer containing 5 to 25 mol % of a vinyl chloride monomer, and 75 to 95 mol % of a vinyl acetate monomer;
    a lithium salt; and
    an organic solvent mixture containing:
        (i) at least one component selected from the group consisting of EC and PC; and
        (ii) a high-boiling-point organic solvent;
    (d) wherein the molar ratio between PVCAC and the lithium salt ranges between about 16:12 to about 40:3, and the amount of the organic solvent mixture does not exceed about 81 mol % of the total polymer electrolyte.

8. The lithium secondary battery according to claim 7 wherein the high-boiling-point organic solvent is N,N-dimethylformamide (DMF), or N-methyl pyrrolidinone (NMP).

9. The lithium secondary battery according to claim 7 wherein the high-boiling-point organic solvent is N,N-dimethylformamide (DMF), which constitutes about 20–60 mol % of the organic solvent mixture.

10. The lithium secondary battery according to claim 7 wherein the high-boiling-point organic solvent is N-methyl pyrrolidinone (NMP), which constitutes about 10–40 mol % of the organic solvent mixture.

11. The lithium secondary battery according to claim 7 wherein the lithium salt is selected from the group consisting of LiClO$_4$, LiCF$_3$SO$_3$, LiPF$_6$, LiAsF$_6$, LiBF$_4$, and LiN(CF$_3$SO$_2$)$_2$.

12. The lithium secondary battery according to claim 7 wherein the lithium salt is LiClO$_4$.

13. A lithium ion battery comprising a polymer electrolyte, wherein the polymer electrolyte contains:
    (a) a poly(vinyl chloride-co-vinyl acetate), or PVCAC, which is a copolymer containing 5 to 25 mol % of a vinyl chloride monomer, and 75 to 95 mol % of a vinyl acetate monomer;
    (b) a lithium salt; and
    (c) an organic solvent mixture containing:
        at least one component selected from the group consisting of EC and PC; and
        (ii) a high-boiling-point organic solvent;
    (d) wherein the molar ratio between PVCAC and the lithium salt ranges between about 16:12 to about 40:3, and the amount of the organic solvent mixture does not exceed about 81 mol % of the total polymer electrolyte.

14. The lithium ion battery according to claim 13 wherein the high-boiling-point organic solvent is N,N-dimethylformamide (DMF), or N-methyl pyrrolidinone (NMP).

15. The lithium ion battery according to claim 13 wherein the high-boiling-point organic solvent is N,N-dimethylformamide (DMF), which constitutes about 20–60 mol % of the organic solvent mixture.

16. The lithium ion battery according to claim 13 wherein the high-boiling-point organic solvent is N-methyl pyrrolidinone (NMP), which constitutes about 10–40 mol % of the organic solvent mixture.

17. The lithium ion battery according to claim 13 wherein the lithium salt is selected from the group consisting of LiClO$_4$, LiCF$_3$SO$_3$, LiPF$_6$, LiAsF$_6$, LiBF$_4$, and LiN(CF$_3$SO$_2$)$_2$.

18. The lithium ion battery according to claim 13 wherein the lithium salt is LiClO$_4$.

* * * * *